United States Patent
Shoner (10) Patent No.: US 6,568,443 B2
(45) Date of Patent: May 27, 2003

(54) CELLULAR TIRE LINER AND AIR CHAMBER SYSTEM FOR PNEUMATIC TIRES

(76) Inventor: Douglas Joseph Shoner, 12244 Truro Ave., Hawthorne, CA (US) 90250

(*) Notice: Subject to any disclaimer, the term of this patent is extended or adjusted under 35 U.S.C. 154(b) by 110 days.

(21) Appl. No.: 09/798,403

(22) Filed: Mar. 2, 2001

(65) Prior Publication Data
US 2001/0037846 A1 Nov. 8, 2001

Related U.S. Application Data (60) Provisional application No. 60/197,184, filed on Apr. 14, 2000.

(51) Int. Cl.[7] .............................. B60C 17/06; B60C 5/00; B60C 7/12; B60C 19/12
(52) U.S. Cl. ......................................... 152/157; 152/312
(58) Field of Search ................................ 152/157, 312, 152/313, 314, 316, 320, 322, 321, 317–319

(56) References Cited

U.S. PATENT DOCUMENTS

| | | | | |
|---|---|---|---|---|
| 676,562 A | * | 6/1901 | Langgaard | 152/316 |
| 1,064,766 A | | 6/1913 | Pfouts | |
| 5,031,679 A | * | 7/1991 | Shoner | 152/157 |
| 5,685,925 A | | 11/1997 | Riquier et al. | |
| 6,116,308 A | | 9/2000 | Yoshida | |

FOREIGN PATENT DOCUMENTS

| | | | | |
|---|---|---|---|---|
| GB | 8437 | * | 3/1897 | 152/312 |
| GB | 6124 | * | 3/1901 | 152/310 |
| GB | 193478 | * | 2/1923 | 152/157 |
| GB | 193600 | * | 3/1923 | 152/320 |

* cited by examiner

Primary Examiner—Adrienne C. Johnstone (57) ABSTRACT

A cellular tire liner and air chamber system for pneumatic tires comprising a cellular tire liner interposed between the interior surface of a tire and an air chamber with a substantial portion of the air chamber being essentially vee shaped and an annular interface that extends from the air chamber to the interior surface of the tire and disconnects the sidewall portions of the tire liner from each other.

12 Claims, 7 Drawing Sheets

PRIOR ART

FIG. 7

CELLULAR TIRE LINER AND AIR CHAMBER SYSTEM FOR PNEUMATIC TIRES

This nonprovisional utility patent application claims the benefit of U.S. Provisional Application No. 60/197,184 filed on Apr. 14, 2000.

BACKGROUND OF THE INVENTION

The present invention is in the field of "flat-proofing" pneumatic tires. Since its invention in 1845 to the present day, the pneumatic tire has only one fundamental problem. The loss of compressed air from inside the tire while in use. If the pneumatic tire is punctured, the entire volume of compressed air inside the tire is lost and the tire goes flat. If just a small portion of the pneumatic tire's structure fails, the entire volume of compressed air inside the tire is lost and the tire goes flat.

This fundamental problem was evident during the summer of 2000 when a tire blow-out problem gained national attention. The National Highway Traffic Safety Administration subsequently announced a total of 271 people who died as a direct result of tire blow-outs, continuing to illustrate the ongoing danger of suddenly losing the air pressure from inside a tire at highway speeds.

The danger of flat tires reaches to both ends of the driving spectrum. Whether you are going 200 mph on a racetrack or you are going 0 mph, caught having to change a flat tire in the wrong place at the wrong time. Indy driver Scott Brayton was killed in 1996 when his right rear tire suddenly went flat while going 230+ mph during practice for the Indy 500. Ennis Cosby was killed in 1997 while changing a flat tire on a dark stretch of road in Los Angeles.

At the present time, other than liquid tire sealants which function essentially the same way, the only commercially available "flat-proofing" means for use on public highways is a tire having a layer of sealant molded into the tread portion of the tire. The sealant layer seals "round" holes up to approximately ¼ of an inch in diameter in the tread only. If a puncture is sustained in the sidewall, the tire will go flat because there is no sealant layer in the sidewalls; if a straight "cut" is made through the tread, the tire will also go flat because the sealant layer will only seal round holes This sealant layer technology goes back about sixty years and really only addresses small nails and related things puncturing the tread. Even without a sealant layer, most nails in the tread of a regular tire just produce a slow leak, not a dangerous blow-out situation. Therefore the sealant technology, which is the only thing currently available for highway use, does not solve the real flat tire problem.

The run-flat tire technology allows run-flat tires to be driven up to fifty miles at reduced speed after the entire volume of compressed air inside the tire is lost due to a puncture. But run-flat technology is limited to tires with low aspect ratios, i.e. small sidewalls. The aspect ratio is the sidewall height divided by the maximum section width.

Figure 7:
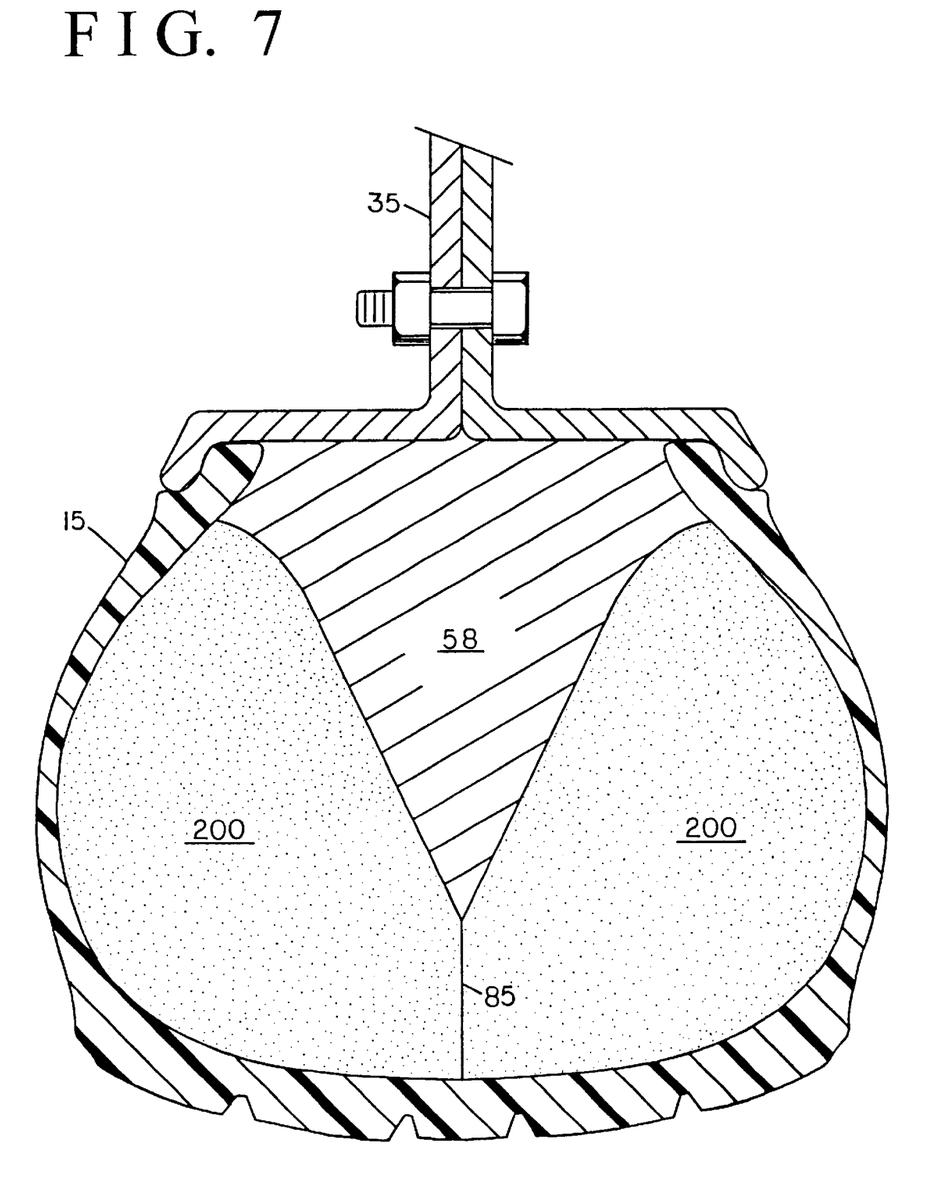
FIG. 7 shows a means of converting the Tire Liner of the present invention into a complete fill configuration.

One approach to achieving a truly "blow-out proof" and "flat-proof" tire is to completely fill the interior of the tire with an elastomeric cellular structure comprised of individual, pressurized closed cells. Applicant's approach is to use the composite cellular structure described in Applicant's U.S. Pat. Nos. 5,031,679 and 5,080,737. The composite cellular structure, or "Syntactic Foam Tire Inserts", described therein, can be made in two different configurations. A complete fill tire insert and a tire "liner" insert. The complete fill tire insert completely fills the interior of a pneumatic tire, with all of the required air pressure captured in a multiplicity of individual pressurized cells. Thus making a pneumatic tire blow-out proof and flat-proof, because the entire volume of compressed air inside the tire can never be lost due to a puncture, or if a portion of the tire fails. While this would seem to be the answer, there are some problems with implementing a complete fill tire insert. The main problem is that a tire that has its interior completely filled with a "tire insert" can not be mounted onto a one-piece drop center wheel. The type of wheel used on all vehicles. In mounting a tire onto a one-piece drop center wheel, a portion of the bead of the deflated tire is first forced into the "drop center" portion of the wheel. This allows the bead to assume an oval shape and slip over the wheel. Trying to mount a tire that has its interior completely filled with a cellular structure that has "pressurized" cells, would be like trying to mount a tire that is already inflated. Try forcing the bead of an inflated tire into the drop center portion of the wheel. Clearly not possible by any practical means. The complete fill tire insert requires a two-piece bolt together wheel. The two-piece bolt together wheel that would be required is shown in FIG. 7. As two-piece wheel 35 in FIG. 7 shows, the two individual halves of the wheel can simply be placed in the tire and bolted together. However, except for some heavy equipment vehicles and the civilian version of the military's HMMWV, no vehicle comes equipped with two-piece bolt together wheels. No manufacturer makes two-piece bolt together wheels to replace the one-piece drop center wheels that come on virtually all vehicles.

The tire "Liner" configuration solves the tire mounting and two-piece wheel problem of the complete fill tire insert. The "Liner", lines the interior surface of the tire with a given thickness, providing a void in the center of the tire for a subsequently pressurized air chamber. The Liner and pressurized Air Chamber function together as a system that establishes the entire load bealing capability of the tire. Because the tire liner insert does not completely fill the interior of the tire, a tire equipped with a "Liner" can be mounted onto existing one-piece Original Equipment Manufactured (O.E.M.) wheels. And while the complete fill tire insert allows for punctures all the way to the wheel, this capability is really unnecessary. As almost all tire punctures encountered during driving, penetrate the tire maybe a couple of inches. Therefore the Liner and Air Chamber System will make a tire blow-out proof and flat-proof. And in the event a puncture does penetrate all the way through the Liner and depressurizes the air chamber, the Liner itself provides sufficient load bearing capability to allow the vehicle to be driven to a safe location to change the tire. Depressurizing the air chamber is the equivalent of releasing that same volume of compressed air out of a regular tire. The tire would be "low", but it still could be driven to a safe location.

Figure 6:
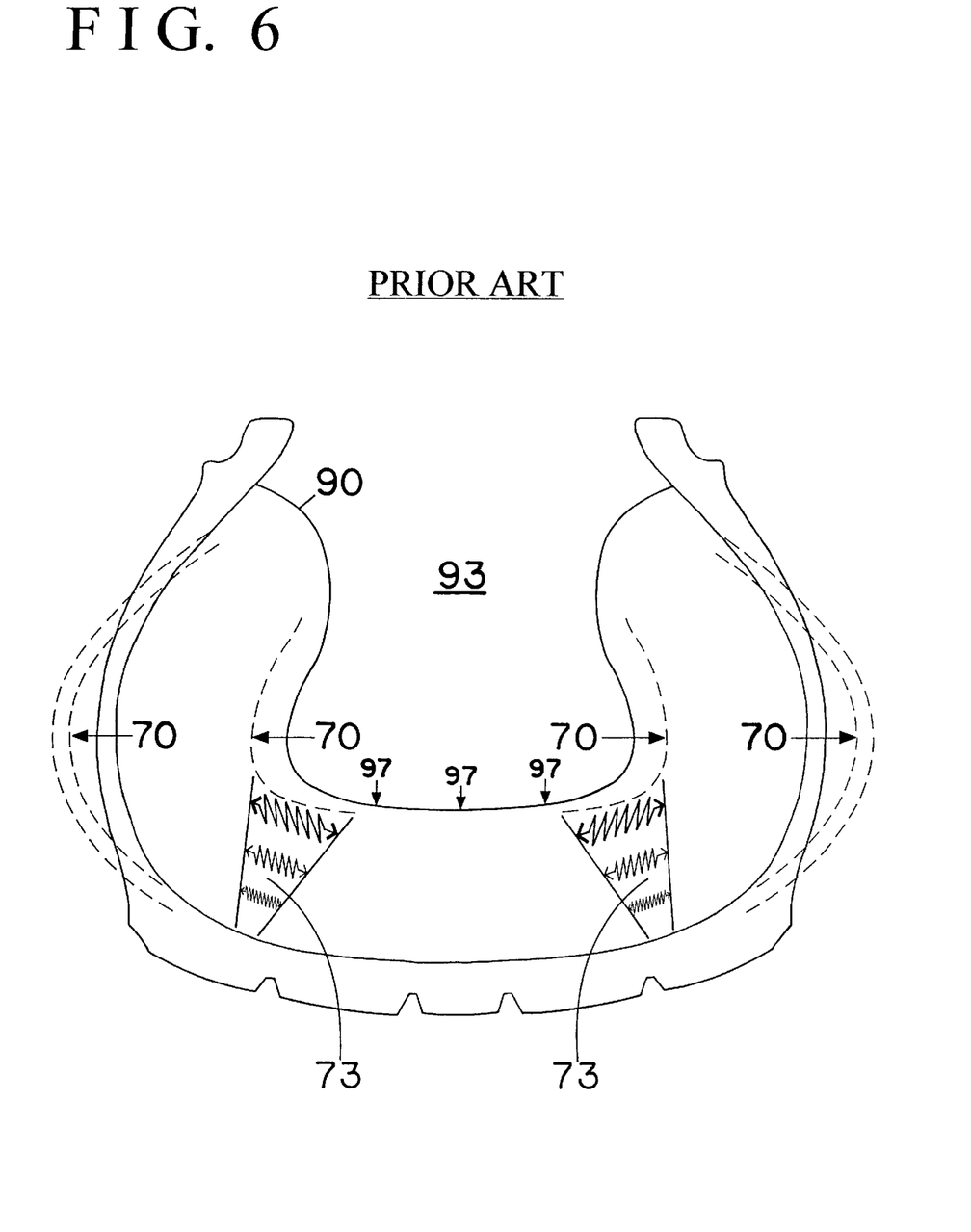
FIG. 6 is a superimposed illustration of a high aspect ratio tire with the tire liner of the prior art, deflecting under a load.

The Liner now would seem to be the answer, but there is a problem with the tire liners of the prior art. FIG. 6 shows an example of the tire liners of the prior art 90, lining a tire with a high aspect ratio, i.e. large sidewalls. Tires with high aspect ratios have greater sidewall displacement for the same percentage of load deflection, than low aspect ratio tires. The prior art liners 90 may work in tires with low aspect ratios. Low aspect ratio tires have small sidewalls and therefore substantially less sidewall displacement under a load. Which is why run-flat tires are low aspect ratio tires only. But if the prior art liner 90 is used in a tire with large sidewalls, there is a problem. Large cars, trucks, SUVs, etc., are all vehicles that utilize large sidewall, high aspect ratio tires. And are all vehicles where run-flat technology will not work. As FIG. 6 shows, in the cross section that is parallel with the rotational axis of the tire, the tire liners of the prior art 90, line this cross section with one structure of uniform thickness. When prior art liner 90 encounters "high tire deflections" during use, an extreme tension load is placed on areas 73, where the sidewall portion is connected to the tread portion. In the May 4, 1998 issue of Design News magazine, page 80, an article on run-flat tires points out the problem of extreme tension for tires running while flat. A localized extreme tension load causes the same problem for a "tire liner" as it does for a tire. So as the large sidewalls of the high aspect ratio tire deflect under load 70, areas 73 are stretched. This is due in part to pressurized air chamber 93 which pushes on prior art liner 90 and keeps liner 90 in contact with the interior surface of the tire at all times. The reason the entire tread portion of prior art liner 90 does not seem to be under a detrimental tension load, is because air pressure force 97 tends to "clamp" the tread portion to the inside surface of the tire and keep it from moving. The air pressure force 97 that pushes on the tread portion of prior art liner 90 is at a right angle to load deflection 70. This is the problem with using prior art liner 90 in a high aspect ratio tire/high deflection application. Because these two lines of force are ninety degrees (90°) to each other, the areas where the sidewall portions are connected to the tread portion 73 have to go into tension during load deflection 70. The more the tire deflects under load, the more extreme the tension load that is placed on areas 73. This cyclical extreme tension load, going from a neutral load (no deflection), to an extreme tension load (deflection), back to a neutral load (no deflection) as a high aspect ratio tire with prior art liner 90 is put to use, generates so much heat that areas 73 actually melt, causing prior art liner 90 to fail.

High tire deflections can not result in extreme tension loads being placed on a tire liner. A tire liner for a high aspect ratio tire should be under a compression load only.

BRIEF SUMMARY OF THE INVENTION

The object of the present invention is to provide a functional means of eliminating pneumatic tire blow-outs and flats for high aspect ratio tires/high deflection applications, that can be utilized with existing one-piece drop center wheels.

The present invention is a system incorporating a cellular tire "Liner", thereby solving the tire mounting and two-piece wheel problem, and an Air Chamber. The present invention Cellular Tire Liner and Air Chamber System provides an air chamber that is essentially vee shaped, which eliminates right angle forces on the sidewalls and tread portion of the Liner and eliminates the localized extreme tension loads. The present invention Cellular Tire Liner and Air Chamber System provides an annular interface which disconnects the sidewall portions from each other, further eliminating extreme tension loads during high tire deflections.

REFERENCE NUMERALS IN THE DRAWINGS

- 15—Pneumatic Tire with Large Sidewalls
- 20—Interior Surface of the Pneumatic Tire
- 25—Inner Tube
- 30—One-Piece Drop Center Wheel
- 35—Two-Piece Bolt Together Wheel
- 40—An Exterior Surface of the Present Invention Tire Liner that is Parallel to the Rotational Axis of the Tire
- 45—View that Looks Perpendicular at the Air Chamber Surface and the Surface that Contacts Adjacent Liner Segments
- 50—Vee Shaped Air Chamber
- 58—Air Chamber Insert
- 65—Tire Tread
- 70—Load Deflection
- 73—Area in Extreme Tension During Load Deflection & Area Where The Sidewall Portions Are Connected To The Tread Portion
- 85—Annular Interface
- 90—Prior Art Tire Liner
- 93—Prior Art Air Chamber
- 95—Rotational Axis of the Tire
- 97—Air Pressure Force that Pushes on the Tread Portion of the Prior Art Tire Liner
- 200—Cellular Tire Liner of the Present Invention

DETAILED DESCRIPTION OF THE INVENTION

The Cellular Tire Liner of the present invention is a cellular structure comprised of a multiplicity of elastomeric cells. The construction of "elastomeric cellular structures" for use in the interior of pneumatic tires is well known in the art. The Tire Liner of the present invention can be made by any of the methods known in the art. The preferred elastomeric cellular structure to be used for the Tire Liner of the present invention, is described in Applicant's U.S. Pat. Nos. 5,031,679 and 5,080,737. The composite cellular structure described therein, provides a lightweight structure that fulfills the requirements for use in pneumatic tires.

Specifically, the preferred elastomeric cellular structure comprises a multiplicity of preconstructed cells comprising enclosed hollow cavities Prior to being incorporated into the cellular tire liner, each of the preconstructed cells is a complete, individual structure. Each of the preconstructed cells comprises an external surface and an internal surface, defining one complete cell wall therebetween of a given thickness, completely enclosing a single hollow center of a given volume. The cell walls are composed of an elastomeric material, and the hollow center of the preconstructed cells contain a gas under pressure above atmospheric. The multiplicity of preconstructed, individual cells have surface portions of the external cell wall surfaces which are engaged with external cell wall surface portions of adjacent cells in a state whereby substantially all of the total external cell wall surface of all cells is in engagement with surrounding portions of external cell wall surfy of the surrounding cells. The multiplicity of preconstructed, individual cells are permanently connected together at the engaged external surface portions in the engaged state to collectively provide the cellular tire liner, whereby the cells of the cellular tire liner remain in the connected and the engaged state.

Figure 1:
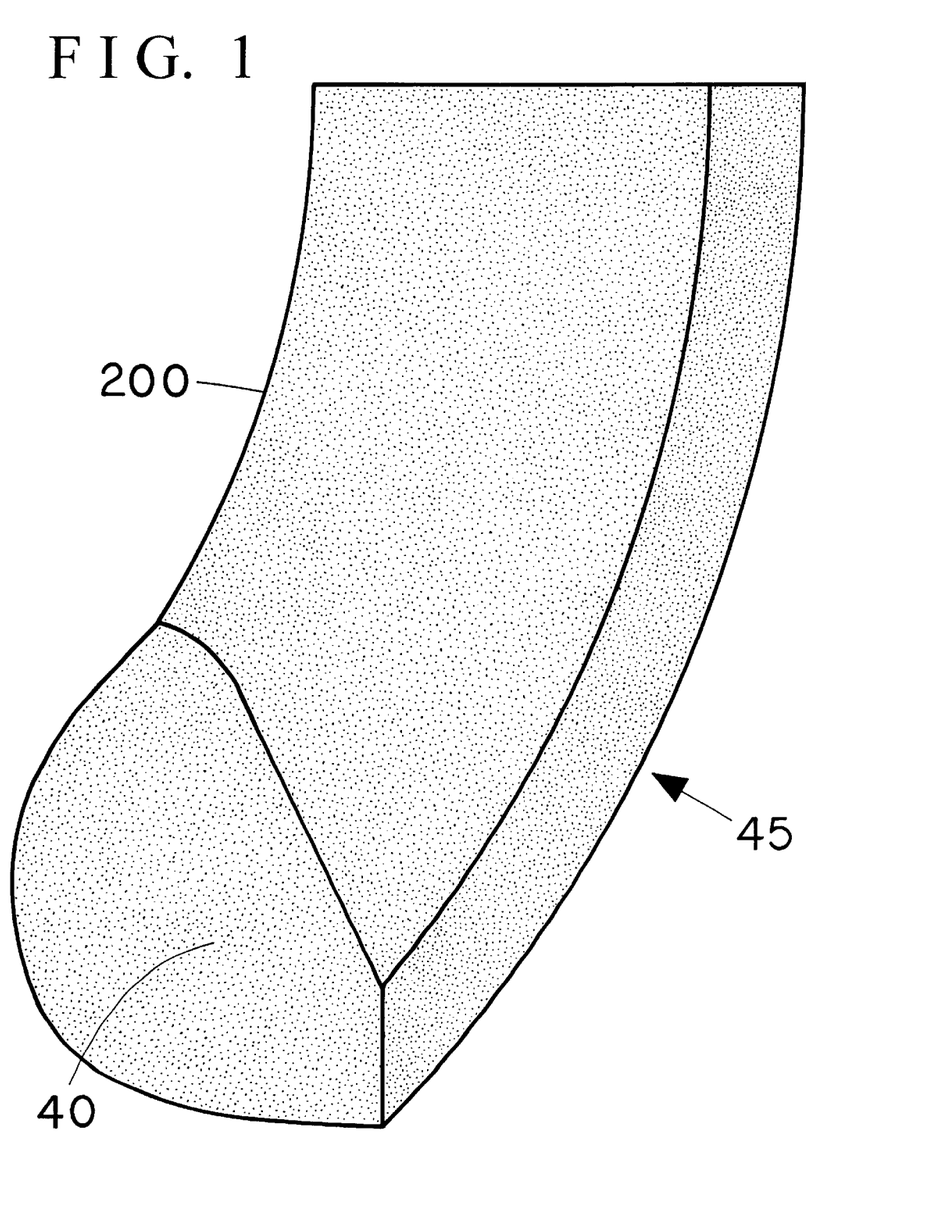
FIG. 1 is an isometric view of one (1) 90 degree Cellular Tire Liner segment of the present invention.

In FIG. 1 there is shown an isometric view of one (1) Cellular Tire Liner 200 of the present invention and view 45 that looks square to the indicated surface. The Liner 200 shown in FIG. 1, is in a 90 degree segment configuration. In a 90 degree segment configuration, it will take eight (8) 90 degree liner segments 200 to completely line the inside of a tire. If the Tire Liner of the present invention is molded in 45 degree segments, it will take sixteen (16) to line the inside of a tire. If the Tire Liner of the present invention is molded in 180 degree segments, it will take four (4) to line the inside of a tire. If the Tire Liner of the present invention is molded in 360 degree segments, it will take two (2) to line the inside of a tire. The Cellular Tire Liner of the present invention can be molded in any "degree" configuration desired.

Figure 2:
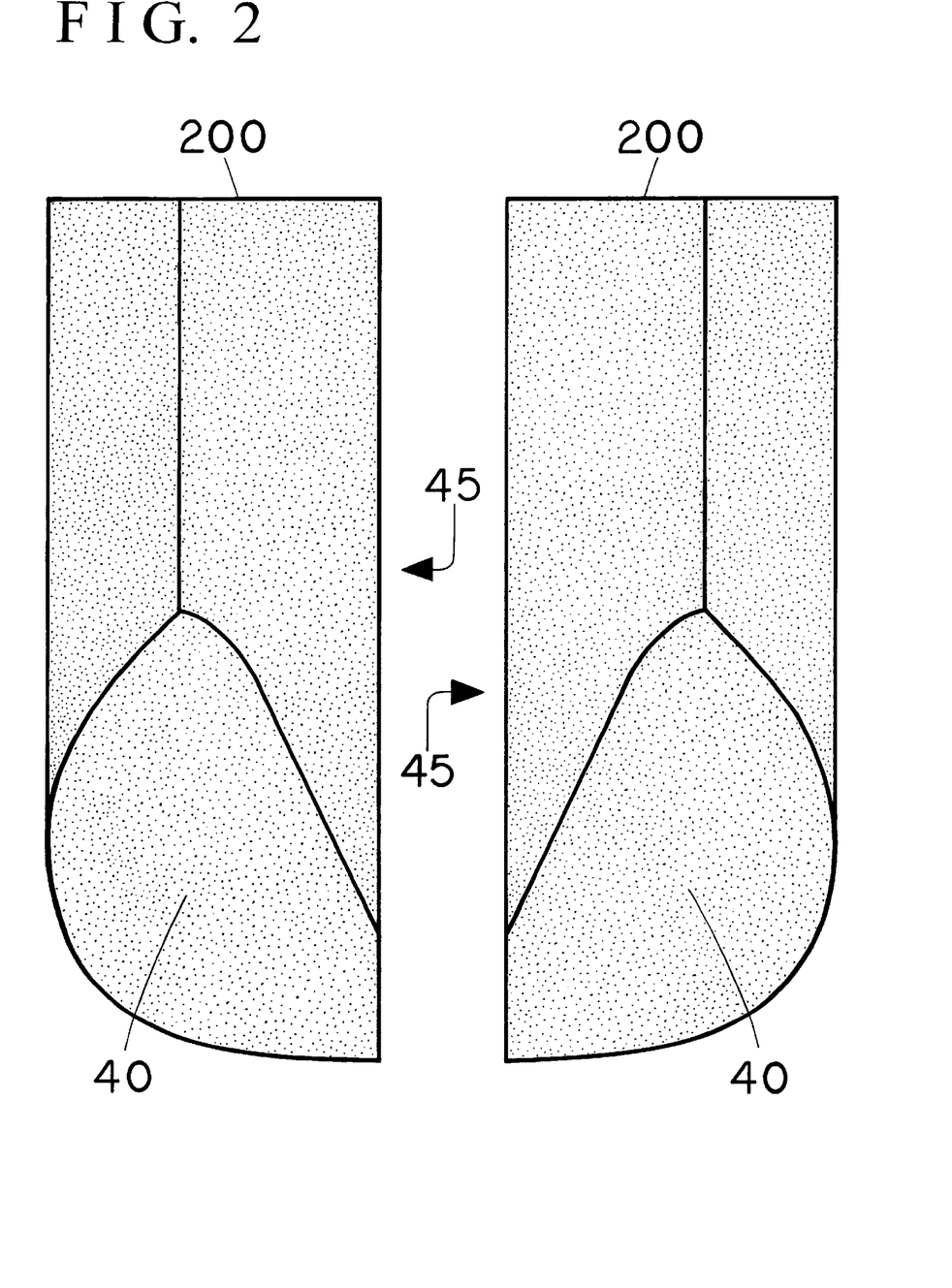
FIG. 2 is a view of two (2) of the 90 degree Liner segments shown in FIG. 1 positioned approximately as they would be oriented inside a tire but spaced apart to show that each is an individual structure.

In FIG. 2 there is shown view 45 and two (2) of the Liner segments 200 shown in FIG. 1, positioned approximately as they would be oriented to each other in a tire, but spaced apart to show they are two independent structures. And that two (2) are required to line the cross section that is parallel with the rotational axis of a tire.

Figure 3:
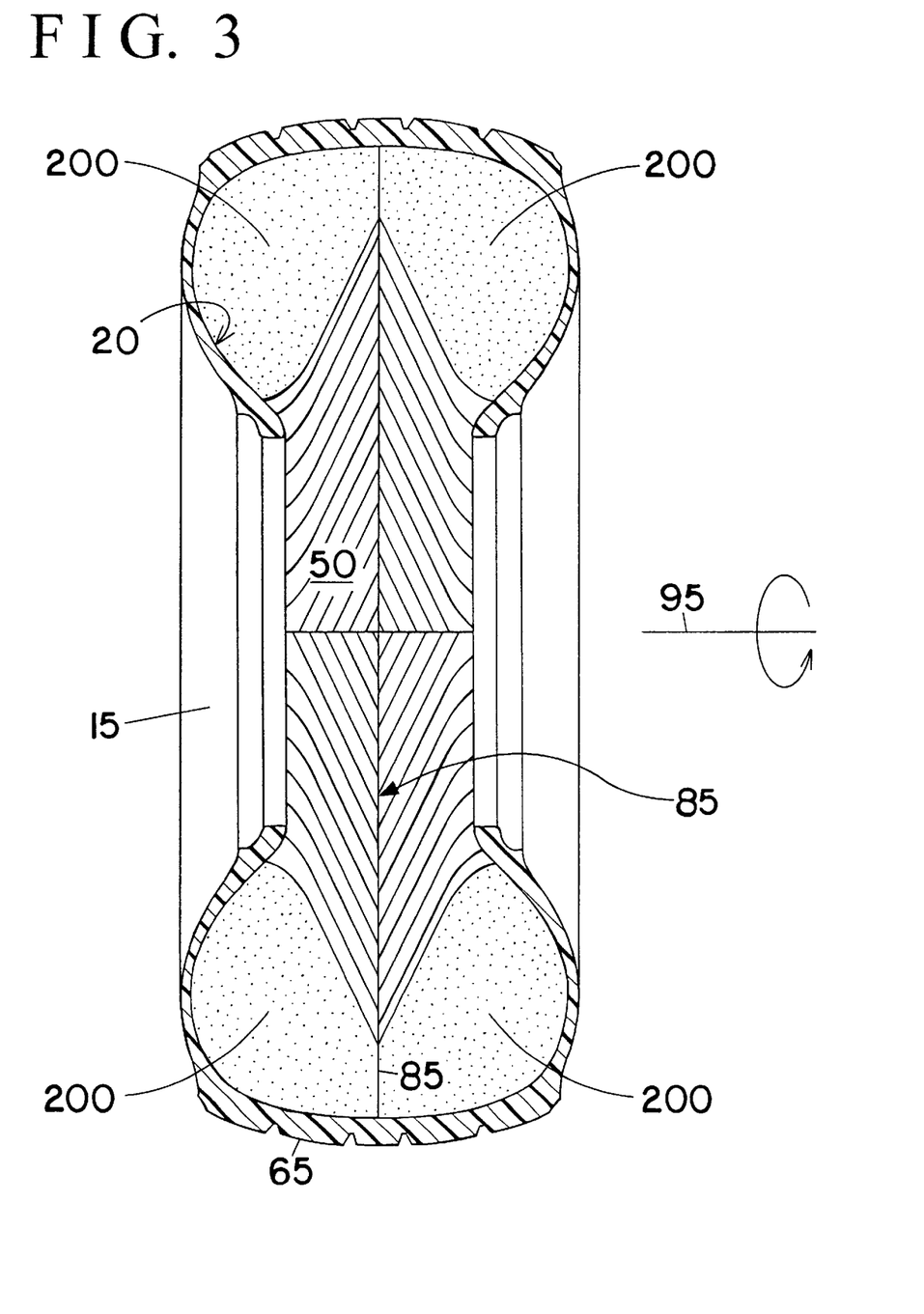
FIG. 3 is a cross sectional view that is parallel with the rotational axis of the tire, illustrating four (4) of the Liners shown in FIG. 1 installed in a tire.

A cross sectional view of a tire lined with the present invention Tire Liner is shown in FIG. 3. FIG. 3 is a cross sectional view that is on and parallel to the rotational axis of the tire. In FIG. 3 there is shown high aspect ratio/large sidewall tire 15, interior surface 20, tire tread 65, four (4) of the Tire Liners 200 shown in FIG. 1, vee shaped air chamber 50 unpressurized, annular interface 85 and rotational axis 95. Tire 15 has an aspect ratio of approximately 80% (the sidewall height is 80% of the maximum section width). Tire Liner 200 of the present invention, provides for air chamber 50 by creating a void in the interior of tire 15. Air chamber 50 as shown in FIG. 3, is not sealed or pressurized. Air chamber 50 is subsequently sealed by an inner tube or any other suitable means and pressurized with air or any other suitable gas to a desired pressure. Tire Liner 200 "lines" the interior of tire 15 by being interposed between interior surface 20 and air chamber 50.

As shown in FIG. 3, a substantial portion of the exterior surface of Tire Liners 200 that are adjacent to the void that is air chamber 50 in the interior of tire 15, forms an essentially vee shape. Because the exterior surface of Tire Liners 200 that are adjacent to air chamber 50 forms a vee, this defines that portion of air chamber 50 as the same vee shape. Each of Tire Liners 200, provides a part of vee shaped air chamber 50. The eight (8) Tire Liners 200 required to completely line tire 15, collectively form vee shaped air chamber 50. FIG. 3 shows that the vee shape formed by Tire Liners 200 has the widest part of the vee furthest from the tread 65 of tire 15.

FIG. 3 shows clearly how the present invention Tire Liner solves the problem of the prior art liners when used for high tire deflection applications. Rather than having two (2) distinct sidewall pieces joined independently to a tread piece, the present invention has the two (2) opposite sidewall portions converging at a point in the tread area, forming a vee. The vee shaped air chamber feature of the present invention, eliminates the right angle lines of force that push on the sidewall portion and the tread portion simultaneously during load deflection, thereby eliminating the extreme localized tension loads, where the sidewall portions are connected to the tread portion.

Figure 4:
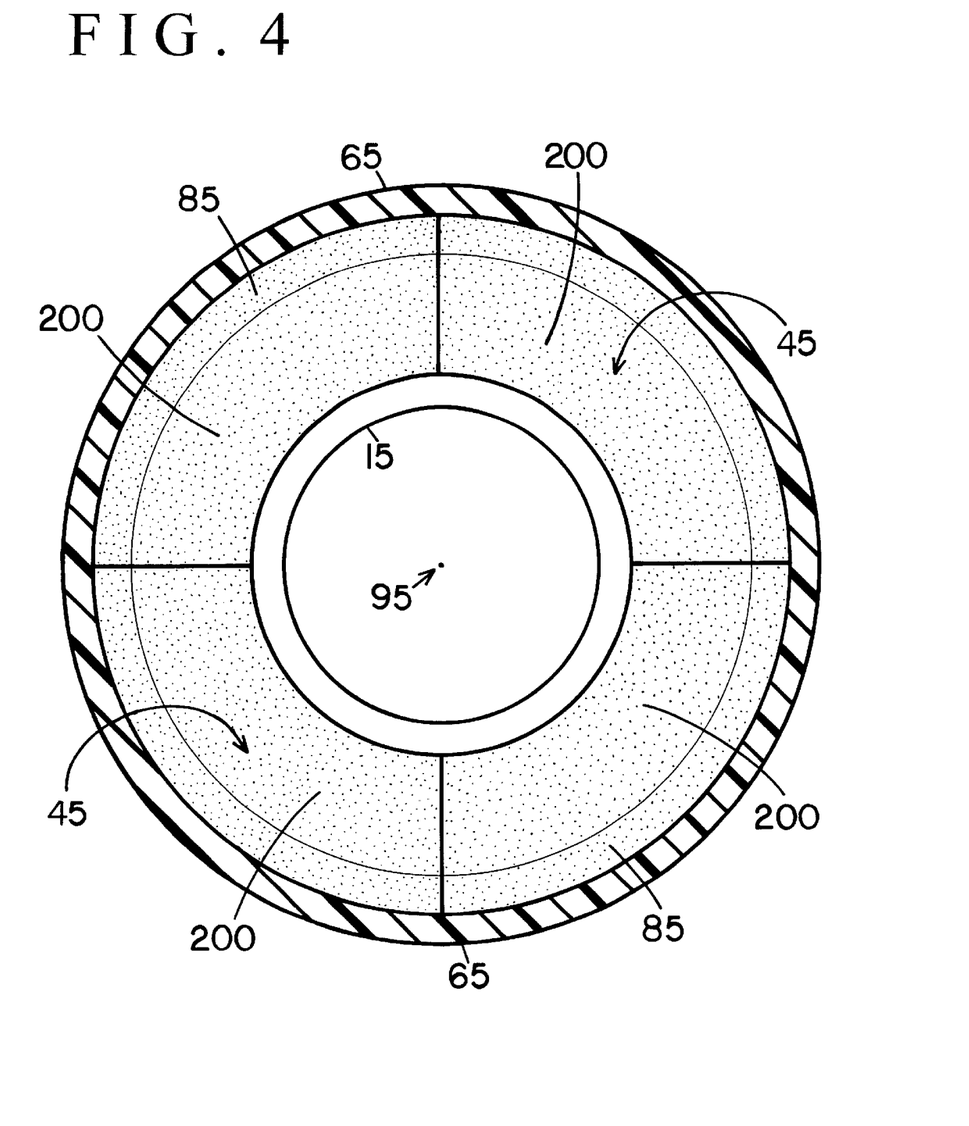
FIG. 4 is a cross sectional view that is perpendicular to the rotational axis of the tire, illustrating four (4) of the Liners shown in FIG. 1 installed in a tire.

FIG. 4 is a cross sectional view of the tire and present invention Tire Liner of FIG. 3, that is perpendicular to the rotational axis of the tire. In FIG. 4 there is shown high aspect ratio/large sidewall tire 15, tire tread 65, four (4) of the Tire Liners 200 shown in FIG. 1, view 45, rotational axis 95 and annular interface 85. Annular interface 85 is established when a multiplicity of Tire Liners of the present invention are installed in and line the interior of a pneumatic tire. In FIG. 4, annular interface 85 can clearly be seen in its entirety. Annular interface 85 is the ring-shaped surface that forms a common boundary between Tire Liners 200 in tire 15. This common boundary between Tire Liners 200 (annular interface 85), is clearly seen in FIG. 3. Annular interface 85 extends from air chamber 50 to interior surface 20 in tread area 65 of tire 15. FIG. 3 shows that annular interface 85 provides a two-piece cross section which disconnects the sidewall portions of the present invention Tire Liner from each other. Because the sidewalls of a pneumatic tire move in opposite directions during load deflection, the annular interface feature of the present invention further eliminates extreme tension loads during high load deflections because the sidewall portions are not connected together. The sidewall portions of the present invention Tire Liner can "move" in opposite directions, independent of each other, during high tire deflections. Again, further eliminating extreme tension loads and keeping the present invention Tire Liner substantially under the desired compression load only.

As shown in FIG. 3, Tire Liners 200 are in contact with interior surface 20 with vee shaped air chamber 50 not pressurized. Pressurization of air chamber 50 is not required to bring the entire exterior surface of Tire Liners 200 that are adjacent to interior surface 20, into contact with interior surface 20, because Tire Liners 200 are in contact with interior surface 20 prior to the pressurization of air chamber 50. This feature of the present invention eliminates the tension load that would be incurred by having to "stretch" a tire liner to bring it into contact with the interior surface of a tire by pressurizing the air chamber.

As also shown in FIG. 3, vee shaped air chamber 50 is "vee shaped" prior to being pressurized. Pressurization of air chamber 50 is also not required to shape the air chamber of the present invention Tire Liner into a vee shape, because the present invention Tire Liner is "vee shaped" prior to being pressurized. This feature of the present invention also eliminates the tension load that would be incurred by having to pressurize the air chamber to "stretch it" into a vee shape.

As further shown in FIGS. 1–5, the present invention Tire Liner is in segments. This segment configuration feature of the present invention provides "breaks" in the overall cellular structure when lining a tire. The segment configuration eliminates tension loads that would be incurred when air chamber 50 is pressurized. This is because it is impossible for the pressurization of the air chamber to cause a tension load to be applied to the Tire Liner of the present invention. This impossibility is evident by trying to pressurize vee shaped air chamber 50 without a tire. Tire Liners 200 would just be pushed outward and away from each other by the air pressure force. The segment configuration feature of the present invention Tire Liner causes a compression load to result from air chamber pressurization.

All of the features of the present invention, vee shaped air chamber, annular interface, tire liner in contact with the interior surface prior to air chamber pressurization, air chamber being vee shaped prior to pressurization and segment configuration, go to eliminating extreme tension loads on a tire liner and producing a tire liner that is substantially under the desired compression load only.

Figure 5:
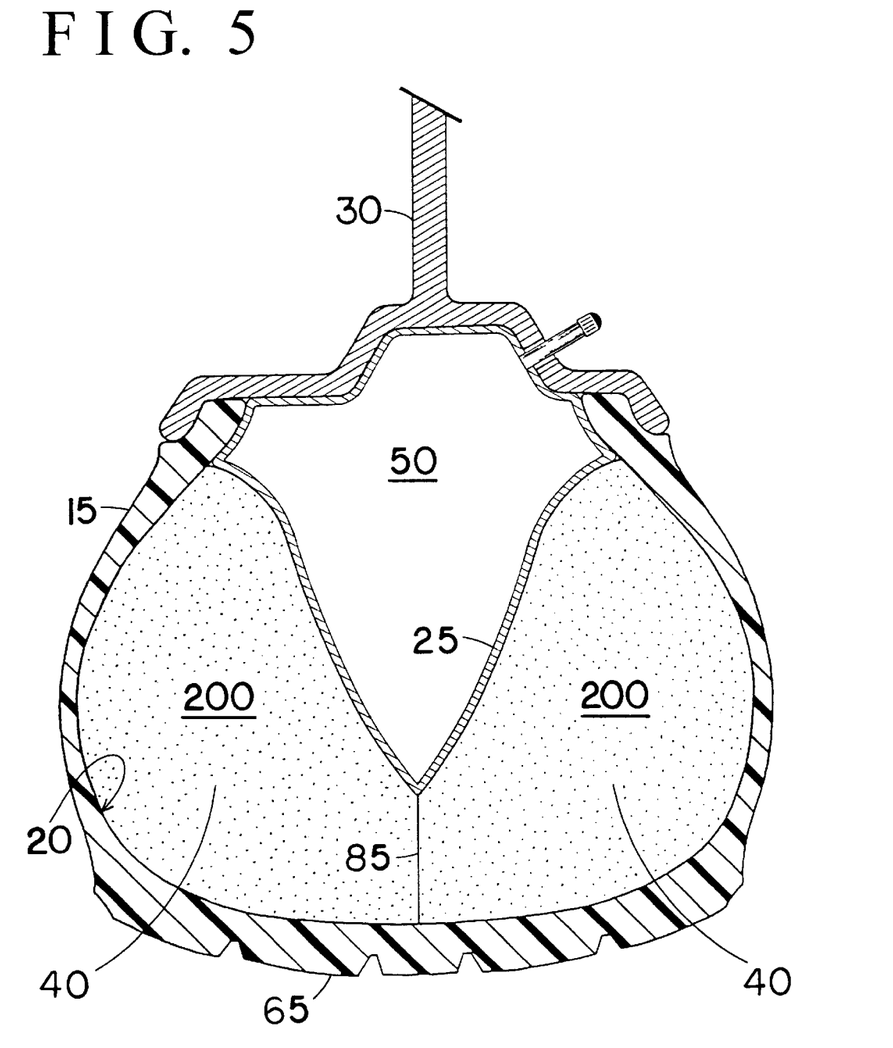
FIG. 5 is a partial cross sectional view of a tire and wheel assembly with the present invention Tire Liners installed for use and the air chamber pressurized.

FIG. 5 is a partial cross sectional view of the tire and present invention Tire Liner of FIG. 3 mounted onto a wheel with the Air Chamber sealed and pressurized. In FIG. 5 there is shown one-piece drop center wheel 30, high aspect ratio/large sidewall tire 15, interior surface 20, tire tread 65, vee shaped air chamber 50 pressurized, inner tube 25, annular interface 85, Tire Liners of the present invention 200 and exterior surface that is parallel 40. Tire 15 is mounted onto one-piece drop center wheel 30 with the Tire Liners of the present invention 200 lining the interior of tire 15. Tire Liners 200 are interposed between interior surface 20 and vee shaped air chamber 50, in FIG. 5, vee shaped air chamber 50 has been sealed by means of inner tube 25 and vee shaped air chamber 50 is also pressurized. The air pressure force in air chamber 50 presses Tire Liners 200 against interior surface 20 of tire 15. This constant pressure from pressurized air chamber 50 stops Tire Liners 200 from rubbing against interior surface 20 and therefore stops the heat that would be generated by this friction, when tire 15 is put to use. Pressurized air chamber 50 also provides part of the total load bearing capability of tire 15.

As FIG. 5 shows, the desired air pressure force exerted by pressurized air chamber 50 on Tire Liners 200 may cause the exterior surface of Tire Liners 200 that are adjacent to air chamber 50 to "bend" inward toward interior surface 20. This deviation from the unpressurized vee shape, does not degrade or lessen the effectiveness or function of this feature of the present invention. Air chamber 50 remains in an essentially vee shape after being pressurized, retaining its intended effect and function.

If an "inner tube" is the means chosen to seal air chamber 50, some steps can be taken to insure that it will not protrude into the area that is annular interface 85 during high load deflections. This may be necessary because the sidewall portions of the present invention Tire Liner can "move" independently in opposite directions during high load deflections. A degree of interference can be molded into Tire Liners 200 in the area that will be annular interface 85. This interference will compress together the surfaces that comprise annular interface 85 when Tire Liners 200 are installed in a tire. The amount of compression that may be required, depending on the specific aspect ratio of a tire, could be approximately ¼ to ⅜ of an inch. Alternatively, a "lip" could be molded on the exterior surface of Tire Liners 200 at the junction where annular interface 85 and vee shaped air chamber 50 meet. Still further, a "lip" and "compression" could possibly be used together. A special inner tube could also be used that would incorporate means of stopping protrusion into annular interface 85 during high tire deflections.

FIG. 7 is an alternative embodiment that provides a means of converting the present invention Cellular Tire Liner and Air Chamber System into a "complete fill" configuration. FIG. 7 is a partial cross sectional view of a tire and wheel assembly including the Tire Liner of the present invention that has been converted into a complete fill configuration. In FIG. 7 there is shown, two-piece wheel 35, tire 15, Tire Liners of the present invention 200, annular interface 85 and air chamber insert 58. In some applications, the ability to go from a liner configuration to a complete fill configuration would be very beneficial. When "maximum flat-proofing capability" is required for a period of time, air chamber insert 58 can be utilized along with two-piece wheel 35. Air chamber insert 58 is comprised of an elastomeric cellular structure which can be of the same or similar cellular structure that comprises Tire Liners 200. Air chamber insert 58 can also be in segments like Tire Liners 200. Air chamber insert 58 is installed in the area that was vee shaped air chamber 50, thereby completely filling the interior of tire 15. When it is desired to go from a "liner" configuration to a "complete fill" configuration, air chamber insert 58 is installed. When it is desired to return to a "liner" configuration, air chamber insert 58 is removed.

The present invention Tire Liner has been described and illustrated in the foregoing specification with both the vee shaped air chamber and annular interface features of the present invention combined. The present invention contemplates possible applications where these features could be utilized independent of each other. Variations and equivalents, of this or any other type, may be made by those skilled in the art without departing from the spirit of the invention, which is intended to be protected herein.

What is claimed is:

1. A cellular tire liner and air chamber system for lining the interior of a pneumatic tire, said system comprising:
   a. a cellular tire liner having an elastomeric cellular structure composed of a multiplicity of elastomeric cells;
   b. an air chamber for said interior of said pneumatic tire that is subsequently sealed and pressurized;
   c. when said cellular tire liner and air chamber system is lining said interior of said pneumatic tire, said cellular tire liner being interposed between the interior surface of said pneumatic tire and said air chamber;
   d. when said cellular tire liner and air chamber system is lining said interior of said pneumatic tire, a substantial portion of the exterior surface of said cellular tire liner that is adjacent to said air chamber forming an essentially vee shape, thereby defining a substantial portion of said air chamber in said essentially vee shape, with the widest part of said essentially vee shape furthest from the tread area of said pneumatic tire;
   e. when said cellular tire liner and air chamber system is lining said interior of said pneumatic tire, a multiplicity of said cellular tire liners are used in said interior to line said pneumatic tire, said multiplicity of said cellular tire liners establishing an annular interface;
   f. each of said cellular tire liners in said multiplicity of said cellular tire liners are individual and independent from other said cellular tire liners in said multiplicity;
   g. said annular interface being a ring-shaped surface forming a common boundary between said individual and independent cellular tire liners;
   h. when said cellular tire liner and air chamber system is lining said interior of said pneumatic tire, said annular interface extends from said air chamber to said interior surface of said pneumatic tire, in said tread area of said pneumatic tire;
   i. when said cellular tire liner and air chamber system is lining said interior of said pneumatic tire and said pneumatic tire is mounted onto a wheel, upon pressurization of said air chamber said, pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

2. The cellular tire liner and air chamber system of claim 1, wherein said elastomeric cellular structure is composed of a multiplicity of elastomeric closed cells.

3. A cellular tire liner and air chamber system for lining the interior of a pneumatic tire, said system comprising:

a. a cellular tire liner having a multiplicity of preconstructed cells comprising enclosed hollow cavities;

b. prior to being incorporated into said cellular tire liner, each of said preconstructed cells is a complete, individual structure;

c. each of said preconstructed cells comprises an external surface and an internal surface, defining one complete cell wall therebetween of a given thickness, completely enclosing a single hollow center of a given volume;

d. said cell wall is composed of an elastomeric material;

e. said hollow center of said preconstructed cells containing a gas within said hollow center under pressure above atmospheric;

f. said multiplicity of preconstructed, individual cells having surface portions of said external cell wall surfaces engaged with external cell wall surface portions of adjacent cells in a state whereby substantially all of the total external cell wall surface of all cells is in engagement with surrounding portions of external cell wall surfaces of said surrounding cells;

g. said multiplicity of preconstructed, individual cells are permanently connected together at said engaged external surface portions in said engaged state to collectively provide said cellular tire liner, whereby the cells of said cellular tire liner remain in said connected and said engaged state;

h. an air chamber for said interior of said pneumatic tire that is subsequently sealed and pressurized;

i. when said cellular tire liner and air chamber system is lining said interior of said pneumatic tire, said cellular tire liner being interposed between the interior surface of said pneumatic tire and said air chamber;

j. when said cellular tire liner and air chamber system is lining said interior of said pneumatic tire, a substantial portion of the exterior surface of said cellular tire liner that is adjacent to said air chamber forming an essentially vee shape, thereby defining a substantial portion of said air chamber in said essentially vee shape, with the widest part of said essentially vee shape furthest from the tread area of said pneumatic tire;

k. when said cellular tire liner and air chamber system is lining said interior of said pneumatic tire, a multiplicity of said cellular tire liners are used in said interior to line said pneumatic tire, said multiplicity of said cellular tire liners establishing an annular interface;

l. each of said cellular tire liners in said multiplicity of said cellular tire liners are individual and independent from other said cellular tire liners in said multiplicity;

m. said annular interface being a ring-shaped surface forming a common boundary between said individual and independent cellular tire liners;

n. when said cellular tire liner and air chamber system is lining said interior of said pneumatic tire, said annular interface extends from said air chamber to said interior surface of said pneumatic tire, in said tread area of said pneumatic tire;

o. when said cellular tire liner and air chamber system is lining said interior of said pneumatic tire and said pneumatic tire is mounted onto a wheel, upon pressurization of said air chamber, said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

4. A pneumatic tire including a cellular tire liner and air chamber system lining the interior of said pneumatic tire, said system lining said interior of said pneumatic tire comprising:

a. a cellular tire liner having an elastomeric cellular structure composed of a multiplicity of elastomeric cells;

b. an air chamber in said interior of said pneumatic tire that is subsequently sealed and pressurized;

c. said cellular tire liner being interposed between the interior surface of said pneumatic tire and said air chamber;

d. a substantial portion of the exterior surface of said cellular tire liner that is adjacent to said air chamber forming an essentially vee shape, thereby defining a substantial portion of said air chamber in said essentially vee shape, with the widest part of said essentially vee shape furthest from the tread area of said pneumatic tire;

e. a multiplicity of said cellular tire liners are used in said interior to line said pneumatic tire, said multiplicity of said cellular tire liners establishing an annular interface;

f. each of said cellular tire liners in said multiplicity of said cellular tire liners in said interior of said pneumatic tire are individual and independent from other said cellular tire liners in said interior of said pneumatic tire;

g. said annular interface being a ring-shaped surface forming a common boundary between said individual and independent cellular tire liners in said interior of said pneumatic tire;

h. said annular interface extends from said air chamber to said interior surface of said pneumatic tire, in said tread area of said pneumatic tire;

i. when said lined pneumatic tire is mounted onto a wheel and said air chamber is pressurized, said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

5. The cellular tire liner and air chamber system of claim 4, wherein said elastomeric cellular structure is composed of a multiplicity of elastomeric closed cells.

6. A pneumatic tire including a cellular tire liner and air chamber system lining the interior of said pneumatic tire, said system lining said interior of said pneumatic tire comprising:

a. a cellular tire liner having a multiplicity of preconstructed cells comprising enclosed hollow cavities;

b. prior to being incorporated into said cellular tire liner, each of said preconstructed cells is a complete, individual structure;

c. each of said preconstructed cells comprises an external surface and an internal surface, defining one complete cell wall therebetween of a given thickness, completely enclosing a single hollow center of a given volume;

d. said cell wall is composed of an elastomeric material;

e. said hollow center of said preconstructed cells containing a gas within said hollow center under pressure above atmospheric;

f. said multiplicity of preconstructed, individual cells having surface portions of said external cell wall surfaces engaged with external cell wall surface portions of adjacent cells in a state whereby substantially all of the total external cell wall surface of all cells is in engagement with surrounding portions of external cell wall surfaces of said surrounding cells;

g. said multiplicity of preconstructed, individual cells are permanently connected together at said engaged external surface portions in said engaged state to collectively provide said cellular tire liner, whereby the cells of said cellular tire liner remain in said connected and said engaged state;

h. an air chamber in said interior of said pneumatic tire that is subsequently sealed and pressurized;

i. said cellular tire liner being interposed between the interior surface of said pneumatic tire and said air chamber;

j. a substantial portion of the exterior surface of said cellular tire liner that is adjacent to said air chamber forming an essentially vee shape, thereby defining a substantial portion of said air chamber in said essentially vee shape, with the widest part of said essentially vee shape furthest from the tread area of said pneumatic tire;

k. a multiplicity of said cellular tire liners are used in said interior to line said pneumatic tire, said multiplicity of said cellular tire liners establishing an annular interface;

l. each of said cellular tire liners in said multiplicity of said cellular tire liners in said interior of said pneumatic tire are individual and independent from other said cellular tire liners in said interior of said pneumatic tire;

m. said annular interface being a ring-shaped surface forming a common boundary between said individual and independent cellular tire liners in said interior of said pneumatic tire;

n. said annular interface extends from said air chamber to said interior surface of said pneumatic tire in said tread area of said pneumatic tire;

o. when said lined pneumatic tire is mounted onto a wheel and said air chamber is pressurized, said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

7. An assembly comprising a pneumatic tire mounted on a wheel, said pneumatic tire including a cellular tire liner and air chamber system lining the interior of said pneumatic tire, said system lining said interior of said pneumatic tire in said assembly comprising:

a. a cellular tire liner having an elastomeric cellular structure composed of a multiplicity of elastomeric cells;

b. an air chamber in said interior of said pneumatic tire that is sealed and pressurized;

c. said cellular tire liner being interposed between the interior surface of said pneumatic tire and said air chamber;

d. a substantial portion of the exterior surface of said cellular tire liner that is adjacent to said air chamber forming an essentially vee shape, thereby defining a substantial portion of said air chamber in said essentially vee shape, with the widest part of said essentially vee shape furthest from the tread area of said pneumatic tire;

e. a multiplicity of said cellular tire liners are used in said interior to line said pneumatic tire, said multiplicity of said cellular tire liners establishing an annular interface;

f. each of said cellular tire liners in said multiplicity of said cellular tire liners in said interior of said pneumatic tire, are individual and independent from other said cellular tire liners in said interior of said pneumatic tire;

g. said annular interface being a ring-shaped surface forming a common boundary between said individual and independent cellular tire liners in said interior of said pneumatic tire;

h. said annular interface extends from said air chamber to said interior surface of said pneumatic tire, in said tread area of said pneumatic tire;

i. said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

8. The cellular tire liner and air chamber system of claim 7, wherein said elastomeric cellular structure is composed of a multiplicity of elastomeric closed cells.

9. An assembly comprising a pneumatic tire mounted on a wheel, said pneumatic tire including a cellular tire liner and air chamber system lining the interior of said pneumatic tire, said system lining said interior of said pneumatic tire in said assembly comprising:

a. a cellular tire liner having a multiplicity of preconstructed cells comprising enclosed hollow cavities;

b. prior to being incorporated into said cellular tire liner, each of said preconstructed cells is a complete, individual structure;

c. each of said preconstructed cells comprises an external surface and an internal surface, defining one complete cell wall therebetween of a given thickness, completely enclosing a single hollow center of a given volume;

d. said cell wall is composed of an elastomeric material;

e. said hollow center of said preconstructed cells containing a gas within said hollow center under pressure above atmospheric;

f. said multiplicity of preconstructed, individual cells having surface portions of said external cell wall surfaces engaged with external cell wall surface portions of adjacent cells in a state whereby substantially all of the total external cell wall surface of all cells is in engagement with surrounding portions of external cell wall surfaces of said surrounding cells;

g. said multiplicity of preconstructed, individual cells are permanently connected together at said engaged external surface portions in said engaged state to collectively provide said cellular tire liner, whereby the cells of said cellular tire liner remain in said connected and said engaged state;

h. an air chamber in said interior of said pneumatic tire that is sealed and pressurized;

i. said cellular tire liner being interposed between the interior surface of said pneumatic tire and said air chamber;

j. a substantial portion of the exterior surface of said cellular tire liner that is adjacent to said air chamber forming an essentially vee shape, thereby defining a substantial portion of said air chamber in said essentially vee shape, with the widest part of said essentially vee shape furthest from the tread area of said pneumatic tire;

k. a multiplicity of said cellular tire liners are used in said interior to line said pneumatic tire, said multiplicity of said cellular tire liners establishing an annular interface;

l. each of said cellular tire liners in said multiplicity of said cellular tire liners in said interior of said pneumatic tire, are individual and independent from other said cellular tire liners in said interior of said pneumatic tire;

m. said annular interface being a ring-shaped surface forming a common boundary between said individual and independent cellular tire liners in said interior of said pneumatic tire;

n. said annular interface extends from said air chamber to said interior surface of said pneumatic tire, in said tread area of said pneumatic tire;

o. said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

10. A method of using an assembly comprising a pneumatic tire mounted on a wheel, said pneumatic tire including a cellular tire liner and air chamber system lining the interior of said pneumatic tire, said system lining said interior of said pneumatic tire in said assembly comprising:

a. a cellular tire liner having an elastomeric cellular structure composed of a multiplicity of elastomeric cells;

b. an air chamber in said interior of said pneumatic tire that is sealed and pressurized;

c. said cellular tire liner being interposed between the interior surface of said pneumatic tire and said air chamber;

d. a substantial portion of the exterior surface of said cellular tire liner that is adjacent to said air chamber forming an essentially vee shape, thereby defining a substantial portion of said air chamber in said essentially vee shape, with the widest part of said essentially vee shape furthest from the tread area of said pneumatic tire;

e. a multiplicity of said cellular tire liners are used in said interior to line said pneumatic tire, said multiplicity of said cellular tire liners establishing an annular interface;

f. each of said cellular tire liners in said multiplicity of said cellular tire liners in said interior of said pneumatic tire are individual and independent from other said cellular tire liners in said interior of said pneumatic tire;

g. said annular interface being a ring-shaped surface forming a common boundary between said individual and independent cellular tire liners in said interior of said pneumatic tire;

h. said annular interface extends from said air chamber to said interior surface of said pneumatic tire, in said tread area of said pneumatic tire;

i. said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized; and said method comprising the step of completely replacing said air chamber by an independent insert which is of substantially the same construction as said elastomeric cellular structure.

11. The cellular tire liner and air chamber system of claim 10, wherein said elastomeric cellular structure is composed of a multiplicity of elastomeric closed cells.

12. A method of using an assembly comprising a pneumatic tire mounted on a wheel, said pneumatic tire including a cellular tire liner and air chamber system lining the interior of said pneumatic tire, said system lining said interior of said pneumatic tire in said assembly comprising:

a. a cellular tire liner having a multiplicity of preconstructed cells comprising enclosed hollow cavities;

b. prior to being incorporated into said cellular tire liner, each of said preconstructed cells is a complete, individual structure;

c. each of said preconstructed cells comprises an external surface and an internal surface, defining one complete cell wall therebetween of a given thickness, completely enclosing a single hollow center of a given volume;

d. said cell wall is composed of an elastomeric material;

e. said hollow center of said preconstructed cells containing a gas within said hollow center under pressure above atmospheric;

f. said multiplicity of preconstructed, individual cells having surface portions of said external cell wall surfaces engaged with external cell wall surface portions of adjacent cells in a state whereby substantially all of the total external cell wall surface of all cells is in engagement with surrounding portions of external cell wall surfaces of said surrounding cells;

g. said multiplicity of preconstructed, individual cells are permanently connected together at said engaged external surface portions in said engaged state to collectively provide said cellular tire liner, whereby the cells of said cellular tire liner remain in said connected and said engaged state;

h. an air chamber in said interior of said pneumatic tire that is sealed and pressurized;

i. said cellular tire liner being interposed between the interior surface of said pneumatic tire and said air chamber;

j. a substantial portion of the exterior surface of said cellular tire liner that is adjacent to said air chamber forming an essentially vee shape, thereby defining a substantial portion of said air chamber in said essentially vee shape, with the widest part of said essentially vee shape furthest from the tread area of said pneumatic tire;

k. a multiplicity of said cellular tire liners are used in said interior to line said pneumatic tire, said multiplicity of said cellular tire liners establishing an annular interface;

l. each of said cellular tire liners in said multiplicity of said cellular tire liners in said interior of said pneumatic tire are individual and independent from other said cellular tire liners in said interior of said pneumatic tire;

m. said annular interface being a ring-shaped surface forming a common boundary between said individual and independent cellular tire liners in said interior of said pneumatic tire;
n. said annular interface extends from said air chamber to said interior surface of said pneumatic tire in said tread area of said pneumatic tire;
o. said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized; and said method comprising the step of completely replacing said air chamber by an independent insert which is of substantially the same construction as said elastomeric cellular structure.

* * * * *